United States Patent
Collins et al.

(10) Patent No.: US 7,895,474 B2
(45) Date of Patent: Feb. 22, 2011

(54) RECOVERY AND RESTART OF A BATCH APPLICATION

(75) Inventors: Bryan Peter Collins, Wiltshire (GB); Graeme Denis McRobert, Salisbury (GB); Arthur James Neil, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/108,099

(22) Filed: Apr. 23, 2008

(65) Prior Publication Data

US 2008/0276239 A1 Nov. 6, 2008

(30) Foreign Application Priority Data

May 3, 2007 (EP) .................................. 07107426

(51) Int. Cl.
G06F 11/00 (2006.01)
(52) U.S. Cl. .................. 714/38; 714/5; 714/6; 714/15
(58) Field of Classification Search ............... 714/5, 714/6, 15, 38
See application file for complete search history.

(56) References Cited

U.S. PATENT DOCUMENTS

| | | | | |
|---|---|---|---|---|
| 5,333,314 A | * | 7/1994 | Masai et al. | 1/1 |
| 5,355,477 A | * | 10/1994 | Strickland et al. | 707/690 |
| 5,455,946 A | * | 10/1995 | Mohan et al. | 1/1 |
| 5,630,047 A | * | 5/1997 | Wang | 714/15 |
| 5,778,388 A | * | 7/1998 | Kawamura et al. | 1/1 |
| 5,978,936 A | * | 11/1999 | Chandra et al. | 714/43 |
| 6,112,987 A | * | 9/2000 | Lambert et al. | 235/380 |
| 6,144,999 A | * | 11/2000 | Khalidi et al. | 709/219 |
| 6,154,847 A | * | 11/2000 | Schofield et al. | 714/4 |
| 6,817,018 B1 | * | 11/2004 | Clarke et al. | 719/313 |
| 7,394,832 B1 | * | 7/2008 | Dykstra | 370/509 |
| 7,506,318 B1 | * | 3/2009 | Lindo et al. | 717/130 |
| 7,673,181 B1 | * | 3/2010 | Lindo et al. | 714/38 |
| 7,685,122 B1 | * | 3/2010 | Lubrano | 1/1 |
| 2004/0215998 A1 | * | 10/2004 | Buxton et al. | 714/2 |
| 2004/0267809 A1 | * | 12/2004 | East et al. | 707/104.1 |
| 2006/0167955 A1 | | 7/2006 | Vertes | |
| 2007/0005664 A1 | * | 1/2007 | Kodavalla et al. | 707/202 |
| 2007/0022146 A1 | * | 1/2007 | Murley et al. | 707/204 |
| 2007/0088970 A1 | * | 4/2007 | Buxton et al. | 714/2 |
| 2007/0260908 A1 | * | 11/2007 | Mitchell et al. | 714/2 |
| 2008/0209421 A1 | * | 8/2008 | Scholtz | 718/101 |
| 2008/0281865 A1 | * | 11/2008 | Price et al. | 707/103 Y |

OTHER PUBLICATIONS

T. Banks, K. E. Davies, C. Moxey, "The evolution of CICS/ESA in the Sysplex environment", IBM Systems Journal, v.36 n. 2, p. 352-360, 1997.*

* cited by examiner

Primary Examiner—Robert Beausoliel
Assistant Examiner—Joshua P Lottich

(57) ABSTRACT

A method of operating a data processing system comprises executing a batch application, the executing comprising reading one or more inputs from one or more data files, performing updates on one or more records according to the or each input read from a data file, and issuing a syncpoint when said updates are completed. During the execution of the batch application, syncpoints are periodically issued and checkpoints are less frequently issued. Following detection of a failure of the batch application, the batch application is restarted with the last issued checkpoint, and the batch application is executed by reading one or more inputs from one or more data files, but not performing updates on said records, until the last issued syncpoint is reached.

20 Claims, 5 Drawing Sheets

RECOVERY AND RESTART OF A BATCH APPLICATION

BACKGROUND OF THE INVENTION

This invention relates to operating a data processing system and more particularly to recovery and restart of a batch application in a data processing system.

In complex data processing systems such as global banking networks running on mainframe systems, a transaction processing system (such as the CICS® transaction server from IBM) manages the interface between application programs and database records. If an application wishes to access a record (such as a customer's bank account balance) stored on a database, then the transaction processing system mediates the transaction. The transaction processing system recalls the record from the database and places a lock on the specific record so that no other application can access or update that record while it is locked. Read or write data requests originating from the accessing application program and relating to the record are then processed. Once the application program has finished with the record, a syncpoint is issued to the transaction processing system, which results in the lock being removed from the record.

In addition to application programs accessing and updating records via a transaction processing system, batch applications are also used to update records. A batch application is effectively an off-line access of the data stored in the records. For example, a very large number of updates (often numbering into the thousands) are processed by a single batch application. In the context of a banking system, a batch application may relate to a series of over-the-counter transactions that need to be applied to computerized records representing the various bank account details of the customers.

A batch application is an automated procedure that processes all of the updates in the batch. Once a batch application is started, each update is processed in turn. This involves accessing each record to be updated, locking the record and then performing the necessary update. Once all of the records referred to in a batch application have been processed, then a syncpoint can be issued and all of the locked records can be unlocked and therefore made available to other applications.

In the past, the operation of transaction processing systems and batch applications did not interfere with each other, as the transaction processing system could be taken offline, for example, at night, and any and all batch applications could be executed at this time. However, the globalization of markets and organizations has meant that systems such as CICS are expected to be online twenty-four hours a day, as access to data records by application programs is constantly required by many data processing systems. This conflicts with the requirements of a batch application, which needs to lock a large number of records when it is processing a data batch.

In relation to file sharing between CICS and batch applications, at present batch applications running on operating systems such as IBM's z/OS® operating system cannot share records for update with a CICS region running in the same image. Traditionally CICS is taken down, the batch applications are run to update the records and then CICS is restarted. However, there is a need for businesses to be able to run their batch jobs while transaction processing systems, such as CICS, are running so that the transaction processing system is available 24 hours a day. Businesses wish to achieve this without any changes to their batch applications.

The reliability of modern hardware and software, combined with online management tooling and other software enhancements, has made system outages rare events. However, there remains one very significant reason for planned CICS system outages; the need for processes other than CICS to operate on data that is "owned" by CICS. Such processes, traditionally batch applications, but in future potentially web-related Java™ applications, cannot currently operate without temporarily making data unavailable to CICS. This makes entire CICS systems, or major applications, temporarily unavailable to online users. With the transaction rates achievable in modern Internet-driven systems, any outage can result in significant loss of service to key customers and loss of revenue to enterprises.

Today, the time available to run batch applications has become constrained for many customers because of many factors, including data center consolidation, globalization of call centers, changes in working practices and other social and economic changes, for instance Sunday trading.

Users have found partial solutions to this problem, mainly based on tools that minimize the impact of the unavailability of data, either by careful scheduling or by limiting either the scope (number of data sets) of outages or their duration. To date, no solution has attempted to eliminate outages entirely.

BRIEF SUMMARY OF THE INVENTION

The present invention may be implemented as a method of executing a batch application. Updates are performed on stored records based on updates read from one or more data files. Syncpoints are issued as the updates are being performed with a final syncpoint being issued when all updates have been completed. One or more checkpoints are also issued as the updates are being performed. If the batch application fails, it is restarted from the last issued checkpoint and is executed by reading one or more inputs from one or more data files without performing updates on associated records until the most recently-issued syncpoint is reached.

The present invention may also be implemented as a computer program product for controlling execution of a batch application. The computer program product includes a computer usable medium embodying computer usable program code, including code configured to read inputs from one or more data files and to perform updates on one or more associated records according to the inputs. The embodied computer usable program code also includes code configured to issue one or more syncpoints and checkpoints as updates are being performed and a final syncpoint when all updates have been performed. Finally, the embodied computer usable program code further includes code that is configured, in response to detection of a failure of the batch application, to restart the batch application from the last issued checkpoint and to execute the batch application without performing updates on associated records until the more recently-issued syncpoint is reached.

The present invention may also be implemented as a data processing system for executing a batch application. The system includes data read logic for reading one or more inputs from one or more data files and update logic for performing updates on one or more records according the read inputs. The system further includes syncpoint logic for issuing one or more syncpoints as updates are being performed and a final syncpoint when all updates have been performed and checkpoint logic for issuing one or more checkpoints as updates are being performed. Finally, the data processing system includes batch application control logic for, in response to detection of a failure of the batch application, restarting the batch application from the last issued checkpoint and executing the batch application by reading inputs from one or more data files without performing updates on associated records until the most recently-issued syncpoint is reached.

DETAILED DESCRIPTION OF THE INVENTION

Figure 1:
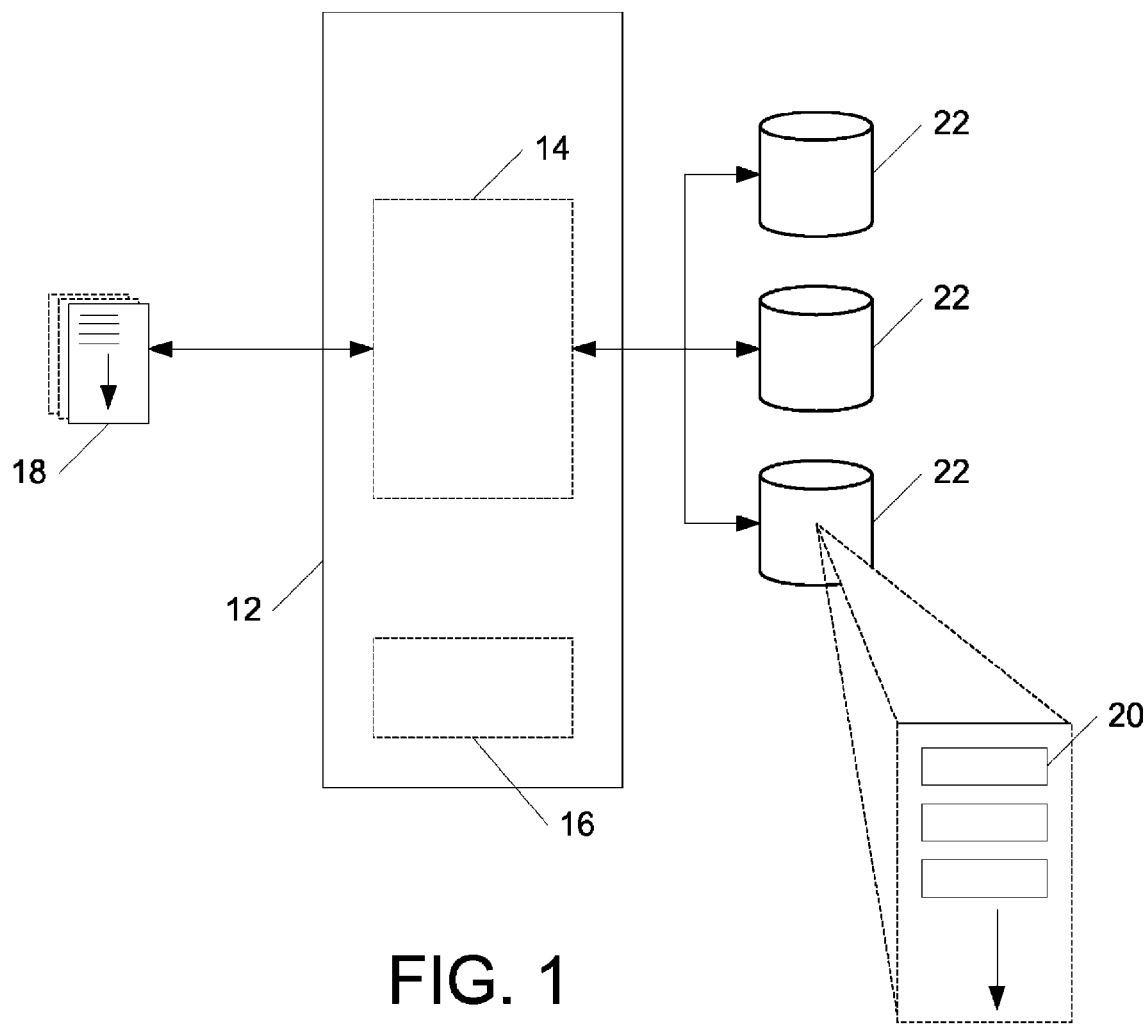
FIG. 1 is a schematic diagram of a data processing system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to a magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The invention provides a method of transparent file sharing for existing batch applications. This would allow transaction processing systems such as CICS and batch applications to make updates to the same records (such as VSAM or Virtual Storage Access Method files for example) at the same time. The invention provides a solution which supports full backout recovery so that, if CICS or the batch application fails, the in-progress record updates are backed out to the most recent syncpoint and the data is then restored to a consistent state. If no changes were allowed to the existing batch application, then the batch application would have to run as a single long running unit-of-work (UOW). This would mean that the batch job would potentially hold thousands of locks in CICS and the online CICS regions would grind to a halt and potentially fail, which is not a satisfactory situation for most systems.

Therefore the invention provides a mechanism to break up the existing batch applications into multiple UOWs by issuing syncpoints on behalf of the batch application. The data processing system also periodically issues checkpoints, which save the current state of the batch application. All of the variables that the batch application uses are saved when a checkpoint is issued. If the batch application subsequently fails, it can be restored and restarted by restoring the batch application to the last issued checkpoint and then working forward to the last issued syncpoint, without actually altering any records as the batch application moves forward to the last issued syncpoint. The period between issued syncpoints is shorter than the period between issued checkpoints. Each issued checkpoint includes a pointer to the current input in a data file.

Advantageously, the method of operating the data processing system further comprises monitoring the inputs read from each data file, operating a predefined algorithm based upon the monitored inputs, and periodically issuing a syncpoint according to an output of the predefined algorithm. Part of the solution provided by the invention is to decide on the appropriate places to issue syncpoints. The data processing system needs to issue a syncpoint to commit a set of record updates that need to be committed as a group but which does not involve a change to the batch application.

The batch application typically reads input from one or more very large sequential files. The batch application processes the data from a set of these input records and then performs an update or multiple updates to a set of records. Appropriately, at that point a syncpoint would be issued because a set of logically connected updates has been performed. Thus the principle of the invention is to monitor the reading of records from the input stream and then issue syncpoints at positions based on the structure of the input data.

The data processing system is configured automatically to issue syncpoints on behalf of the batch application. The batch application is in effect made up of many small units of work, each of which consists of a set of record updates that must be committed at the same time. The system must determine when to issue syncpoints; i.e., to determine where the units of work start and end.

The system is operated to base the positioning of syncpoints on information in the records in the sequential input files that are input to the batch application. For example, in one situation, each record in a sequential input file will start a new unit of work. Or, alternatively, batches of records in the input file are processed as a single unit of work in the batch application. A user would have the capability of influencing which records in the input stream would signal that a new unit of work is starting.

Another way in which the system may decide on the issuing of syncpoints is that there might be, in a particular application, a certain fixed number of input records that would be processed as a single unit of work. If that number were one, then the system would know that each record read from the input stream would be starting a new unit of work. Not only would each update start a new unit of work, it would terminate the previous unit of work. Thus, this would be an appropriate place to take a syncpoint.

In a different system each unit of work would process, for example, four input records. The data processing system would then count the input records and when the fifth input record is read the system would know that a new unit of work was starting and the old unit of work was finished and the system would issue a syncpoint. In other cases certain data in an input record might signify the start of a new unit of work. For example, when byte 1 of a record contains 'S' then that might indicate the start of a new unit of work. Thus every time the batch application reads a record with an 'S' in the first byte, the system would note that a new unit of work was starting and the old unit of work had finished and a syncpoint would be issued. The information in the record would already exist but the system provides an interface for the user to tell the system which information to look for in a record update.

By these techniques the data processing system would be able to issue syncpoints at appropriate points on behalf of the batch application without any need to change the batch application. The system would need to provide the user with a way of telling how to identify a record that started a logical unit of work within the batch application.

Preferably, the method of operating the data processing system further includes storing images of the record updates, and when restarting the batch application and executing the batch application by reading one or more inputs from one or more data files, but not performing updates on said records, comparing each unperformed update to a stored image of the corresponding record update. By storing images of the updates as the batch application executes and then, when in the restore and restart mode, comparing the unperformed updates to the stored images, a check can be made to see if the restoration of the batch application has been achieved correctly. The updates generated as the batch application is worked forward from the last issued checkpoint should be identical to the stored images for the same input. If there is any discrepancy, the restoration can be halted. This may result in the process being tried again, or outputting an alert to an administrator, for example.

FIG. 1 shows a data processing system 10 which includes a mainframe computer 12 that provides a processing function. The mainframe 12 has a batch application 14 that has its own address space within the mainframe 12. The mainframe 12 also has a transaction processing system 16 which may be a CICS region within the mainframe 12.

When the batch application 14 is being executed, the application 14 communicates with one or more data files 18 and applies updates to records 20 being stored by databases 22. The execution of the batch application 14 comprises reading one or more inputs from the data files 18, performing updates on one or more records 20, according to the inputs read from the data files 18, and ultimately issuing a syncpoint when the updates are completed. As each record 20 is accessed by the batch application 14 during the execution of the batch, then that record 20 is locked until the completion of the batch application 14, where the syncpoint releases the locks on all of the records 20 accessed by the batch application 14.

In a known conventional arrangement, while the batch application 14 is being executed, the CICS region 16 is not part of the batch process, and is either taken offline while the batch application 14 is executing, or is unable to access any of the specific records 20 that have had locks placed on them by the batch application 14, as the batch application works through the entries in the data file 18.

Figure 2:
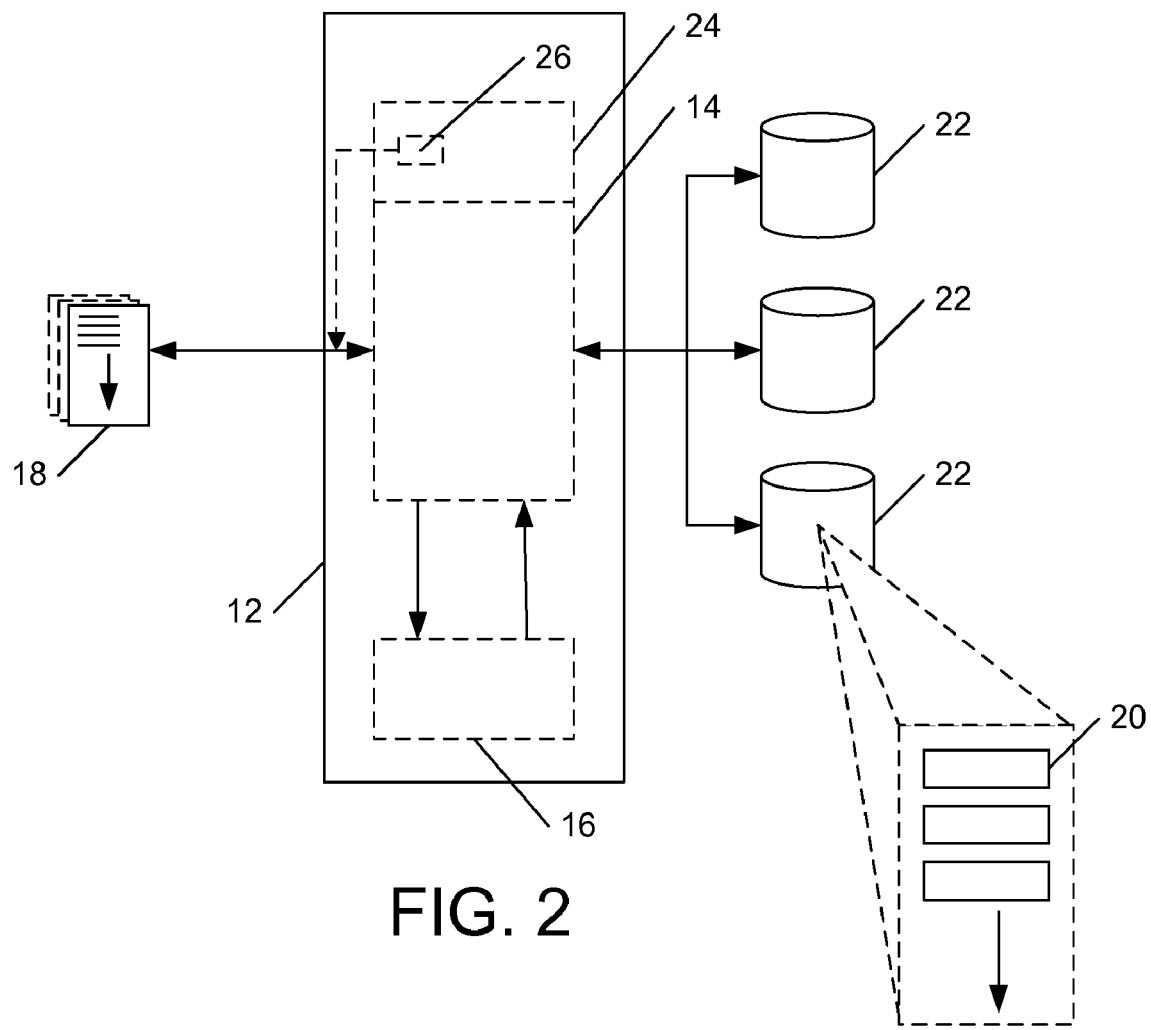
FIG. 2 is a schematic diagram of a second data processing system.

FIG. 2 shows a second data processing system 10. An application program 24 is written into the same address space as the batch application 14 (without any change needed to the batch application 14). This application program 24 is configured to monitor the inputs read from the data files 18 and to perform a predefined algorithm 26 based upon the monitored inputs. The predefined algorithm 26 can be simple and, for example, can be arranged to generate an output following a fixed number of inputs being read from a data file 18. The data processing system 10 of FIG. 2 is arranged periodically to issue a syncpoint, during the execution of the batch application 14, according to the output of the predefined algorithm 26. This is achieved by intercepting data requests from the batch application 14 to the records 20, and routing the intercepted data requests through the transaction processing system 16 (the CICS region). This intercepting of the data requests from the batch application 14 to the records 20 can comprise intercepting internal communications within the batch application 14. In effect, the application program 24 monitors calls within the batch application 14, and internal communications to the output interface of the batch application 14 are intercepted by the program 24 and rerouted through the CICS region 16.

In this configuration, the step of periodically issuing a syncpoint, during the execution of the batch application 14, is carried out by the transaction processing system 16. The system of FIG. 2 breaks up the batch defined by the data files 18 into a series of much smaller units of work. A syncpoint is issued after each of these smaller units of work is completed. This ensures that large numbers of records 20 are not held by locks and the CICS region 16 can mediate access to records 20 required by other application programs. If CICS receives a data request from another application in respect of a record 20 for which a lock is being applied for the current unit of work being processed by batch application 14, this is handled in the normal manner and CICS holds that data request until the lock is released.

The algorithm 26 is used in monitoring the input to the batch application 14 and in defining a breakup of the inputs into separate units of work. An output is generated that triggers the issuing of a syncpoint when a unit of work completes, according to the rules of the algorithm 26. The predefined algorithm 26 can generate an output following detection of a data flag in an input being read from a data file 18. This data flag can be selected by a user and can be as simple as looking for a stated character at a specific bit position in an input received from the file 18.

Figure 3:
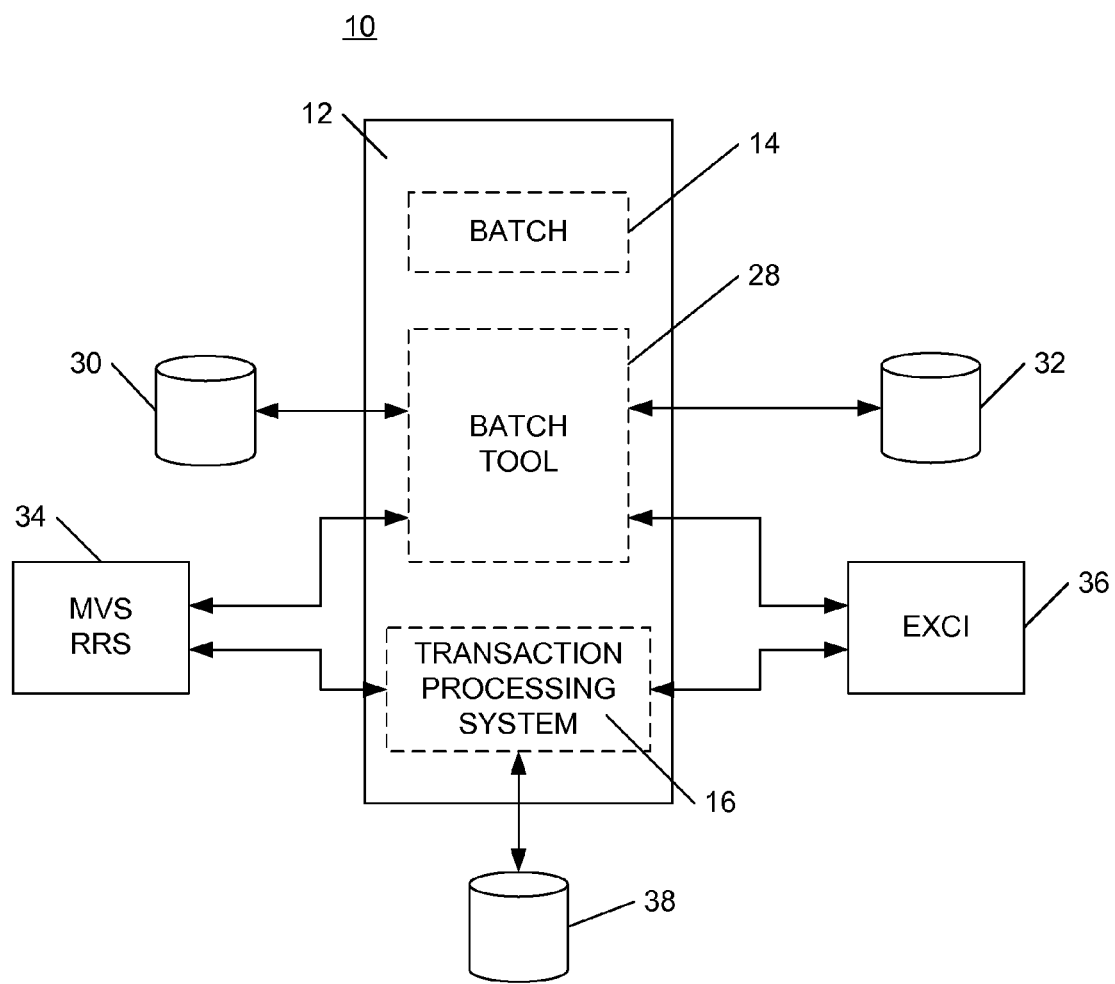
FIG. 3 is a schematic diagram of a third data processing system.

FIG. 3 shows a third data processing system 10, which uses a Batch Tool application program 28 to mediate between the batch application 14 and the transaction processing system 16, which may be a standard implementation of a CICS transaction processing system. The batch application 14 includes a shared VSAM file request/response unit which interfaces with Batch Tool 28. Batch Tool 28 is responsible for the issuing of syncpoints and for restarting (auto and manual) the system and request mapping. Batch Tool 28 is connected to a restart database 30, a checkpoint database 32, an MVS RRS (Multiple Virtual Storage Resource Recovery Service) unit 34 and an EXCI (External Call Interface) unit 36. The transaction processing system 16 connects to shared records such as are stored as VSAM datasets in a database 38.

The primary objective of Batch Tool 28 is to eliminate completely transaction processing system application outages caused by the inability of a transaction processing system to share its VSAM file data. Batch Tool 28 enables non-transaction processing system programs to access VSAM file data through the transaction processing system, so that the transaction processing system appears to treat each batch application 14 as just another transactional user. In return for getting access to a transaction processing system's file data on behalf of batch applications, Batch Tool 28 has to ensure that the client non-transaction processing system applications are operating as if they were well-designed transactional applications. This requires short duration units of work, changes being hardened when committed, changes able to be backed out upon failure of units of work, the proper handling of error conditions, co-ordinated with transaction processing system handling, and able to restart from a recent point in time and back out failures, following any catastrophic failure.

Batch Tool 28 has to be applicable to existing batch applications 14 without requiring them to be modified. Many existing batch applications, by their structure, are unable to operate as well-designed transactional applications. If they were run as is, many batch applications 14 would hold transaction processing system locks for the duration of the batch job, which could be a very long time. This would result in online transactions suffering long delays due to waits for locks or being abended due to timeouts or, in the worst case, deadlocks.

Rather than requiring compliance of non-transaction processing system client programs, such as the batch application 14, through redesign, Batch Tool 28 provides for these applications the infrastructure to achieve compliance. In practice, Batch Tool 28 takes control by intercepting VSAM requests that the batch applications make, and creating granularity, both in the stream of data requests in normal operation and in the sequence of events in restart and recovery in the event of job or system failure.

This role is crucial when working with unchanged, legacy, batch applications 14. These aged applications 14 are usually unsophisticated, with simple error handling and little, if any, recovery and restart capability. Batch Tool 28 addresses these problems by issuing syncpoints on behalf of the batch application 14, and tracks and manages status and restart processing in the event of any failure.

In summary, the functions of Batch Tool 28 include intercepting and redirecting file requests from z/OS batch applications, where the file(s) are being managed by a transaction processing system, dynamically splitting up large batch jobs, presenting them to the transaction processing system as a series of small units of work, and working with recovery management applications to co-ordinate commitment or rollback of file changes. Batch Tool 28 also automatically inserts syncpoints at appropriate places in a job stream, with user defined syncpoint frequency by, for example, time or number of updates and can dynamically split up large batch jobs into Checkpoint Restartable units with user defined Checkpoint frequency by, for example, time or number of updates. Batch Tool 28 can handle communication failures such that they are transparent to the batch applications and do not require a restart, where possible, can ensure backout of all changes, to all shared files, to last successful syncpoint, and can provide restart from the last successful checkpoint.

The use of the system of FIG. 3 with the Batch Tool 28 eliminates the batch window for virtually all batch applications, without requiring any batch application code changes, with minimal JCL (Job Control Language) or process changes and without having any significant negative impact on transaction processing system response time, service levels or availability.

Batch Tool 28 operates without having a significant effect on batch application performance. In particular, elapsed time remains acceptable. Depending on the nature of the application there are likely to be user requirements to have certain batch jobs complete within a certain time frame, for example check clearing has to be complete by a statutory time every day so banks can settle financial positions between themselves. The current quantification of acceptable performance is no more than a doubling of batch job elapsed time. In this embodiment, the backing up of data files before and after the batch job are no longer required.

The system of FIG. 3 has a mechanism to provide basic file data sharing between multiple MVS address spaces. This is provided by the reuse of transaction processing system file sharing, based on MRO (Multi Region Operation) Function Shipping and transaction processing system mirror transactions. Although this is currently limited to sharing between transaction processing system address spaces, the EXCI capability 36, which provides Distributed Program Link (DPL) between a non-transaction processing system MVS address space and a transaction processing system Server address space, can be used. The Batch Tool solution is based on enhancements to EXCI to support shipping of File Control requests.

With a basic file sharing mechanism, the system is able to provide a way to intercept application file requests without requiring any program changes to the batch application 14. This function also maps the VSAM request issued by the batch application 14 to a transaction processing system format that can be shipped by EXCI to the transaction processing system system that owns the files. This must all be done in a way that is transparent to the existing batch application 14, such that it appears to the batch application 14 that the batch application 14 is still accessing a non-shared file, under exclusive control.

This means that, for example, new errors (that could arise due to the fact that there are new components being used) must be handled within Batch Tool 28 and not exposed to the batch application 14, in any way. Locking is fundamental to a shared environment, but is totally absent from the exclusive control environment in which the batch application 14 thinks it is running. Therefore locking, timeouts, and deadly embrace situations all need to be dealt with transparently with respect to the batch application 14.

With the capabilities provided above, the system provides a solution which provides transparent file sharing for existing batch jobs. However, with no other changes, the existing batch job would run as a single long running unit-of-work (UOW). This means that the batch job would potentially hold thousands of locks in the transaction processing system and the online transaction processing system regions would grind to a halt and potentially fail. Therefore there is provided a mechanism to break the existing batch job up into multiple UOWs by issuing syncpoints on behalf of the batch application 14. Batch Tool 28 has to issue the syncpoints at appropriate places and the syncpoints are handled by MVS Resource Recovery Services unit 34 which acts as the syncpoint coordinator.

The system 10 also provides checkpoint restart and positional recovery. The capabilities described above (of issuing periodic syncpoints) result in a break up of the batch job without having a significant impact on online transaction processing system transaction response times. However, should the batch application 14 fail, there needs to be a mechanism which will allow the system to be restarted either automatically or manually from the point of failure. What is possible is the ability to create restart checkpoints at periodic (less frequently than the syncpoints mentioned above) intervals, which are limited as they are expensive to create (Elapsed Time, CPU and I/O) and then to restart from the most recent checkpoint.

The system is running transactionally and therefore the transaction processing system will backout any uncommitted units of work to the most recent syncpoint in cases of failure. What is provided is the ability for the batch job which is restarted at the most recent checkpoint to "catch-up" with the state of the data as backed out to the most recent syncpoint. This is achieved by use of the Restart Dataset which is created by Batch Tool and contains a record of all the VSAM requests and responses since the most recent checkpoint.

Figure 4:
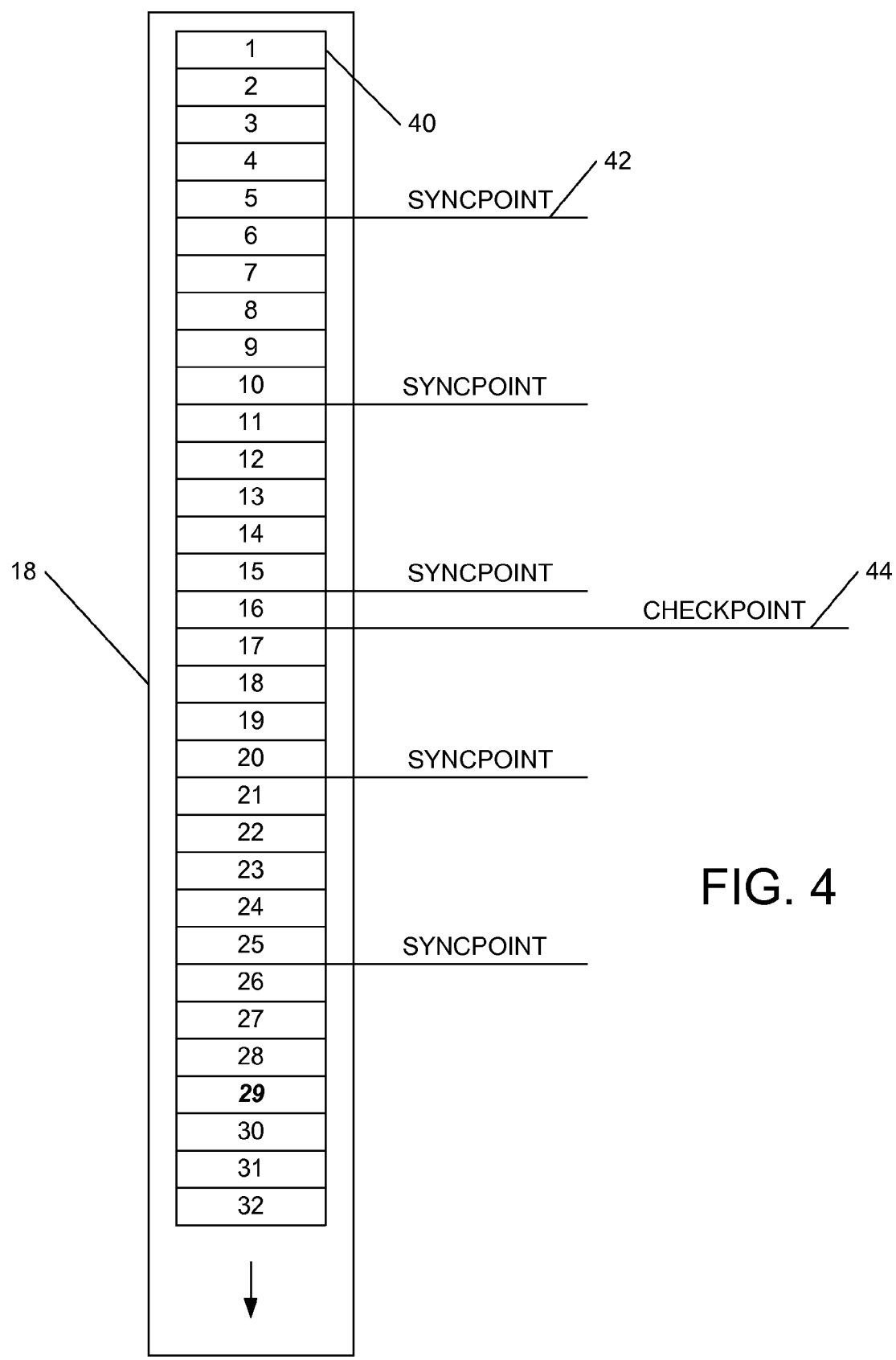
FIG. 4 is a schematic diagram of a data file of inputs.

FIG. 4 illustrates the handling of the recovery and restart procedure once it is detected that the batch application 14 has failed. This Figure shows a data file 18, which comprises inputs 40 that the batch application 14 will work through. During the execution of the batch application 14, Batch Tool 28 will periodically issue a syncpoint 42, and periodically issue a checkpoint 44. In FIG. 4, the syncpoints 42 are shown as being issued after every five inputs 40. When a syncpoint 42 is issued, then the changes in the associated records 20, that have been updated according to the inputs 40, will be hardened, and the locks on those records 20 released. The checkpoint 44 is issued periodically, for example, after every sixteen inputs 40 have been processed by the batch application 14. The checkpoint 44 saves the current state of the batch application 14 by recording the value of all of the variables in the address space of the batch application 14.

Following detection of a failure of the batch application 14, it is necessary to recover and restart the batch application 14. This process comprises restarting the batch application 14 using the last issued checkpoint 44 and executing the batch application 14 by reading one or more inputs 40 from the data file 18, but not performing updates on any records 20, until the last issued syncpoint 42 is reached. In the context of FIG. 4, it is assumed that a failure occurs when the batch application has reached input number 29 (shown in an italicized font in the Figure). At this point the restart and recovery process begins.

Firstly, a syncpoint manager within the overall system data processing system must back up the updates to records that correspond to the inputs numbers 26, 27 and 28, as these updates have not been hardened by a subsequent syncpoint. Then the internal state of the batch application is restored by use of the last stored checkpoint 44. The checkpoint 44 includes a pointer to the current input in the data file 18, so the batch application 14 will next read input number 17 as the next update to carry out. However, later issued syncpoints 42 have already hardened the records 20 that have been updated with the later inputs 40 in the file 18. It is at this point that Batch Tool 28 intercepts the outputs of the batch application (being the updates corresponding to the input numbers 17 to 25) and does not allow these updates to be applied to any records. Once the batch application 14 has reached input number 25, then the normal execution of the batch application 14 continues, with the Batch Tool 28 periodically issuing syncpoints 42 and checkpoints 44, as discussed above.

As a check on the efficacy of the restart process, the Batch Tool 28 can be configured to store images of the normal record updates. When restarting the batch application 14 and while the batch application 14 is executing by reading one or more inputs 40 from the data file 18 (but not performing updates on any records 20) the Batch Tool component 28 can compare each unperformed update to a stored image of the corresponding record update.

Figure 5:
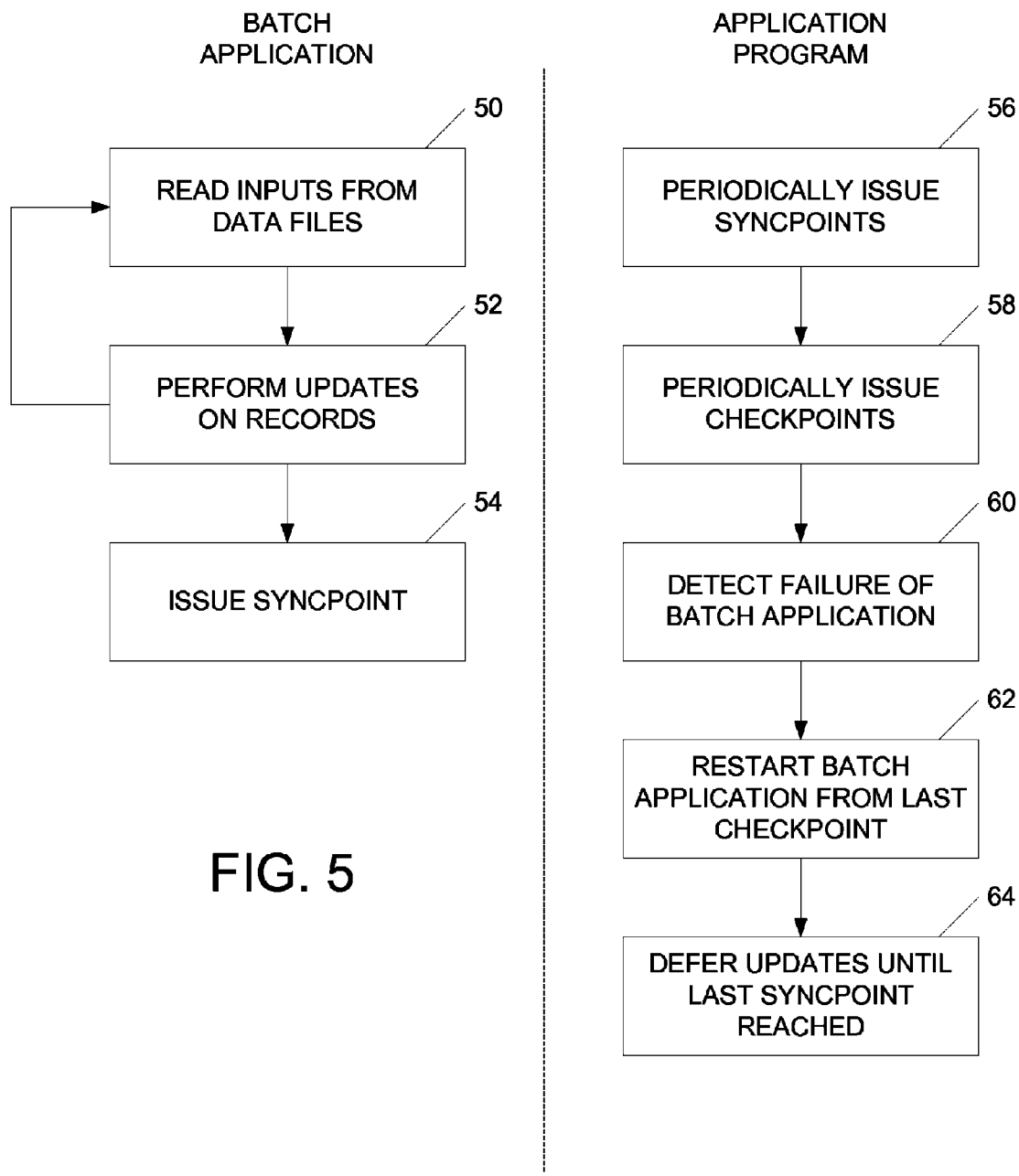
FIG. 5 is a flow diagram of a method of operating a data processing system.

FIG. 5 summarizes the method of operating a data processing system 10 for the purpose of restoring and restarting the batch application 14 after a failure has been detected. The two components, the batch application 14 and the application program (such as Batch Tool 28) are both written into address space within the mainframe computer 12, and the application program is intercepting the communications of the batch application 14 with the records 20 that the batch application is updating.

On the left hand side of the diagram, the execution of the batch application 14 is shown, the execution including reading (operation 50) one or more inputs 40 from one or more data files 18, performing updates (operation 52) on one or more records 20, and ultimately, issuing a syncpoint (operation 54) when the updates are completed. On the right hand side of the diagram, the application program, during the execution of the batch application 14, periodically issues a syncpoint 42 (operation 56) and less frequently a checkpoint 44 (operation 58). Following detection (operation 60) of a failure of the batch application 14, the application program is configured to restart the batch application 14 (operation 62) using the last issued checkpoint 44, and while the batch application is executing by reading one or more inputs from one or more data files, to defer performing updates (operation 64) on the records 20, until the last issued syncpoint is reached.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of executing a batch application comprising:
   reading inputs from one or more data files;
   performing updates on one or more associated records according to the inputs;
   issuing one or more syncpoints as the updates are being performed;
   issuing one or more checkpoints as the updates are being performed;
   issuing a final syncpoint when all updates have been performed; and
   in response to detection of a failure of the batch application,
      restarting the batch application from the last issued checkpoint, and
      executing the batch application by reading one or more inputs from one or more data files without performing updates on associated records until the most recently-issued syncpoint is reached.

2. A method according to claim 1 further comprising:
   monitoring the inputs read from the one or more data files;
   performing a predetermined algorithm based on the monitored inputs; and
   issuing syncpoints in accordance with the results of performing the predetermined algorithm.

3. A method according to claim 2 wherein performing the predetermined algorithm further comprises:
   maintaining a count of the number of inputs read since the last issued syncpoint;
   issuing a new syncpoint when the maintained count reaches a predetermined number; and
   resetting the count to zero after the new syncpoint is issued.

4. A method according to claim 2 further comprising:
   storing images of record updates; and
   when executing the batch application following a restart of the batch application from the last issued checkpoint, comparing inputs read from the data files to the stored images.

5. A method according to claim 4 wherein the interval between issued syncpoints is shorter than the interval between issued checkpoints.

6. A method according to claim 2 wherein the interval between issued syncpoints is shorter than the interval between issued checkpoints.

7. A method according to claim 6 wherein each issued checkpoint includes a pointer to the input currently being read from a data file.

8. A computer program product comprising a computer usable medium having computer usable program code stored thereon, said computer usable program code when loaded onto and executed by a computer causing the computer to control the execution of a batch application, said computer usable program code comprising:
   computer usable program code configured to read inputs from one or more data files;
   computer usable program code configured to perform updates on one or more associated records according to the inputs;
   computer usable program code configured to issue one or more syncpoints as the updates are being performed;
   computer usable program code configured to issue one or more checkpoints as the updates are being performed;
   computer usable program code configured to issue a final syncpoint when all updates have been performed; and
   computer usable program code configured to, in response to detection of a failure of the batch application,
      restart the batch application from the last issued checkpoint, and
      execute the batch application by reading one or more inputs from one or more data files without performing updates on associated records until the most recently-issued syncpoint is reached.

9. A computer program product according to claim 8 further comprising:
   computer usable program code configured to monitor the inputs read from the one or more data files;
   computer usable program code configured to perform a predetermined algorithm based on the monitored inputs; and
   computer usable program code configured to issue syncpoints in accordance with the results of performing the predetermined algorithm.

10. A computer program product according to claim 9 wherein said computer usable program code configured to perform the predetermined algorithm further comprises:
    computer usable program code configured to maintain a count of the number of inputs read since the last issued syncpoint;
    computer usable program code configured to issue a new syncpoint when the maintained count reaches a predetermined number; and
    computer usable program code configured to reset the count to zero after the new syncpoint is issued.

11. A computer program product according to claim 9 further comprising:
    computer usable program code configured to store images of record updates; and
    computer usable program code configured, when executing the batch application following a restart of the batch application from the last issued checkpoint, to compare inputs read from the data files to the stored images.

12. A computer program product according to claim 11 wherein the interval between issued syncpoints is shorter than the interval between issued checkpoints.

13. A computer program product according to claim 9 wherein the interval between issued syncpoints is shorter than the interval between issued checkpoints.

14. A computer program product according to claim 13 further comprising computer usable program code configured to include a pointer in each issued checkpoint to the input currently being read from a data file.

15. A data processing system for executing a batch application comprising:
　　data read logic for reading one or more inputs from one or more data files;
　　update logic for performing updates on one or more records according to the inputs read from the data files; and
　　syncpoint logic for issuing one or more syncpoints as the updates are being performed and a final syncpoint when all updates have been performed;
　　checkpoint logic for issuing one or more checkpoints as the updates are being performed; and
　　batch application control logic for, in response to detection of a failure of the batch application,
　　　restarting the batch application from the last issued checkpoint, and
　　　executing the batch application by reading one or more inputs from one or more data files without performing updates on associated records until the most recently-issued syncpoint is reached.

16. A data processing system according to claim 15 further comprising:
　　monitoring logic for monitoring the inputs read from the one or more data files; and
　　execution logic for performing a predetermined algorithm based on the monitored inputs,
　　wherein said syncpoint logic issues syncpoints in accordance with the results of performing the predetermined algorithm.

17. A data processing system according to claim 16 wherein said batch application control logic further comprises:
　　a counter for maintaining a count of the number of inputs read since the last issued syncpoint;
　　logic for issuing a new syncpoint when the maintained count reaches a predetermined number; and
　　reset logic for resetting the counter to zero after the new synpoint is issued.

18. A data processing system according to claim 17 wherein the interval between issued syncpoints is shorter than the interval between issued checkpoints.

19. A data processing system according to claim 16 further comprising:
　　storage logic for storing images of the record updates; and
　　compare logic for, when executing the batch application following a restart of the batch application from the last issued checkpoint, comparing inputs read from the data files to the stored images.

20. A data processing system according to claim 16 wherein the interval between issued syncpoints is shorter than the interval between issued checkpoints.

* * * * *